(12) United States Patent
Haddad et al.

(10) Patent No.: US 12,712,821 B2
(45) Date of Patent: Aug. 18, 2026

(54) METHOD AND SYSTEM TO IMPLEMENT DEDICATED QUEUE BASED ON USER REQUEST

(71) Applicant: Telefonaktiebolaget LM Ericsson (publ), Stockholm (SE)

(72) Inventors: Wassim Michel Haddad, San Jose, CA (US); Joel Halpern, Leesburg, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 48 days.

(21) Appl. No.: 18/993,142

(22) PCT Filed: Jul. 12, 2022

(86) PCT No.: PCT/IB2022/056432

§ 371 (c)(1),
(2) Date: Jan. 10, 2025

(87) PCT Pub. No.: WO2024/013545

PCT Pub. Date: Jan. 18, 2024

(65) Prior Publication Data

US 2026/0005973 A1 Jan. 1, 2026

(51) Int. Cl.
*H04L 47/31* (2022.01)
*H04L 47/24* (2022.01)
(Continued)

(52) U.S. Cl.
CPC .............. *H04L 47/31* (2013.01); *H04L 47/24* (2013.01); *H04L 47/50* (2013.01);
(Continued)

(58) Field of Classification Search
CPC ......... H04L 47/31; H04L 47/24; H04L 47/50; H04L 47/6295; H04L 47/11; H04W 28/0289
See application file for complete search history.

(56) References Cited

U.S. PATENT DOCUMENTS 5,479,598 A 12/1995 Feitelson et al.
5,877,764 A 3/1999 Feitelson et al.
(Continued)

FOREIGN PATENT DOCUMENTS

CA 2668306 A1 12/2010
EP 4013124 A1 6/2022
WO 01/77867 A1 10/2001

OTHER PUBLICATIONS

James A. Brunetti et al. "Open Network Quality of Service and Bandwidth Control: Use Cases, Technical Architecture, and Business Models", Bell Labs Technical Journal 16(2), 133-152 (2011), 20 pages. (Year: 2011).*

(Continued)

*Primary Examiner* — G. C. Neurauter, Jr.
(74) *Attorney, Agent, or Firm* — NICHOLSON DE VOS WEBSTER & ELLIOTT LLP

(57) ABSTRACT

Embodiments include methods, electronic device, storage medium, and computer program to implement a dedicated queue based on a user request. In one embodiment, a method comprises: receiving a first message to optimize one or more data flows based on a quality-of-service request for an end user; enabling a first queue dedicated to the one or more data flows sourced for the end user in the network node based on the first message; and upon a determination of congestion in the network, marking packets in the one or more data flows stored in the first queue as candidates to drop based on a queue size of the first queue, wherein the marking is to set explicit congestion notification bits of the packets.

20 Claims, 11 Drawing Sheets

(51) Int. Cl.
*H04L 47/50* (2022.01)
*H04L 47/6295* (2022.01)
*H04W 28/02* (2009.01)
*H04L 47/11* (2022.01)

(52) U.S. Cl.
CPC ..... *H04L 47/6295* (2013.01); *H04W 28/0289* (2013.01); *H04L 47/11* (2013.01)

(56) References Cited

U.S. PATENT DOCUMENTS

| | | | | |
|---|---|---|---|---|
| 7,694,222 | B2 | 4/2010 | Steen et al. | |
| 8,149,708 | B2 * | 4/2012 | Oz | H04L 47/2441 370/235 |
| 8,402,343 | B2 | 3/2013 | Radulescu | |
| 8,599,836 | B2 | 12/2013 | Van Buren et al. | |
| 8,903,737 | B2 | 12/2014 | Cameron et al. | |
| 9,349,172 | B2 | 5/2016 | Lai et al. | |
| 9,408,273 | B2 | 8/2016 | Wee et al. | |
| 10,380,020 | B2 | 8/2019 | Ambroladze et al. | |
| 10,886,466 | B2 | 1/2021 | Jung et al. | |
| 2007/0083375 | A1 | 4/2007 | Lee et al. | |
| 2007/0150299 | A1 | 6/2007 | Flory | |
| 2008/0167001 | A1 | 7/2008 | Wong | |
| 2009/0182609 | A1 | 7/2009 | Kelleher | |
| 2011/0004562 | A1 | 1/2011 | Hennessy et al. | |
| 2012/0195196 | A1 * | 8/2012 | Ghai | H04W 28/24 370/235 |
| 2017/0187641 | A1 * | 6/2017 | Lundqvist | H04L 47/70 |
| 2020/0234003 | A1 | 7/2020 | Bakman | |
| 2021/0409335 | A1 * | 12/2021 | Zhu | H04L 47/24 |
| 2025/0219958 | A1 * | 7/2025 | Bouchebbah | H04L 47/2416 |

OTHER PUBLICATIONS

K. Samdanis et al. "Service Boost: Towards On-demand QoS Enhancements for OTT Apps in LTE", 2013 21st IEEE International Conference on Network Protocols (ICNP), Goettingen, Germany, 2013, pp. 1-6, doi: 10.1109/ICNP.2013.6733663, 6 pages. (Year: 2013).*

Briscoe, et al., "Low Latency, Low Loss, Scalable Throughput (L4S) Internet Service: Architecture—draft-ietf-tsvwg-I4s-arch-17", Transport Area Working Group, Internet-Draft, Mar. 4, 2022, 39 pages.

Brunello, et al., "Low Latency Low Loss Scalable Throughput in 5G Networks," 2021 IEEE 93rd Vehicular Technology Conference (VTC2021-Spring), 2021, 7 pages.

De Schepper, et al., "DualQ Coupled AQMs for Low Latency, Low Loss and Scalable Throughput (L4S)—draft-ietf-tsvwg-aqm-dualq-coupled-23", Transport Area Working Group, Internet-Draft, May 4, 2022, 56 pages.

Ramakrishnan, et al., "The Addition of Explicit Congestion Notification (ECN) to IP", Network Working Group, Request for Comments: 3168, Sep. 2001, 63 pages.

White, "Operational Guidance for Deployment of L4S in the Internet—draft-ietf-tsvwg-I4sops-03", Transport Area Working Group, Internet-Draft, Apr. 28, 2022, 26 pages.

* cited by examiner

METHOD AND SYSTEM TO IMPLEMENT DEDICATED QUEUE BASED ON USER REQUEST

CROSS-REFERENCE TO RELATED APPLICATIONS

This application is a National stage of International Application No. PCT/IB2022/056432, filed Jul. 12, 2022, which is hereby incorporated by reference.

TECHNICAL FIELD

Embodiments of the invention relate to the field of networking; and more specifically, to implementing one or more dedicated queues based on a request for an end user.

BACKGROUND ART

Dynamic Boost, also known as Dynamic End-User Boost (DEB), is a service provided to an end user which allows the end user to explicitly request increasing quality-of-service (QoS) of ongoing application(s) via increasing the throughput.

Dynamic Boost may be provided through a dedicated application which runs on an end-user device. Such application may detect one or more data flows that correspond to one or more applications running on the end-user device and that are identified to require the increased QoS, and pass them to a communication network, which may prioritize the data flows when feasible.

To provide Dynamic Boost, it is not guaranteed that the communication network would prioritize the data flows as the communication network may operate on a best-effort basis. Additionally, without additional resources dedicated to accommodating the end user request, increasing the QoS for the requesting applications may affect the performance of other services offered by the communication network. For example, the services that share the path with the corresponding data flows that are prioritized may suffer work performance. Furthermore, Dynamic Boost allows an end user to specify a desired bandwidth, for which the communication network is to prioritize resources, but it does not allow the end user to specify a desired latency or jitter, thus the benefit of such optimization may be limited.

SUMMARY OF THE INVENTION

Embodiments include methods, network nodes, storage medium, and computer program to implement a dedicated queue based on a user request. In one embodiment, a method comprises: receiving a first message to optimize one or more data flows based on a quality-of-service request for an end user; enabling a first queue dedicated to the one or more data flows sourced for the end user in the network node based on the first message; and upon a determination of congestion in the network, marking packets in the one or more data flows stored in the first queue as candidates to drop based on a queue size of the first queue, wherein the marking is to set explicit congestion notification bits of the packets.

Embodiments include network nodes to implement a dedicated queue based on a user request. In one embodiment, a network node comprises a processor and machine-readable storage medium that provides instructions that, when executed by the processor, are capable of causing the electronic device to perform: receiving a first message to optimize one or more data flows based on a quality-of-service request for an end user; enabling a first queue dedicated to the one or more data flows sourced for the end user in the network node based on the first message; and upon a determination of congestion in the network, marking packets in the one or more data flows stored in the first queue as candidates to drop based on a queue size of the first queue, wherein the marking is to set explicit congestion notification bits of the packets.

Embodiments include machine-readable storage media to implement a dedicated queue based on a user request. In one embodiment, a machine-readable storage medium that provides instructions that, when executed, are capable of causing the electronic device to perform: receiving a first message to optimize one or more data flows based on a quality-of-service request for an end user; enabling a first queue dedicated to the one or more data flows sourced for the end user in the network node based on the first message; and upon a determination of congestion in the network, marking packets in the one or more data flows stored in the first queue as candidates to drop based on a queue size of the first queue, wherein the marking is to set explicit congestion notification bits of the packets.

By implementing embodiments as described, a network may implement an on-demand performance enhancement through setting explicit congestion notification bits of packets, and that extends the performance enhancement technology such as L4S to be tailored for a specific end user, (2) one or more specific applications/data flows of the particular end user, and/or (3) to be implemented during a specific time period that is configurable, and such flexibility enhances user experience and saves network resources.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
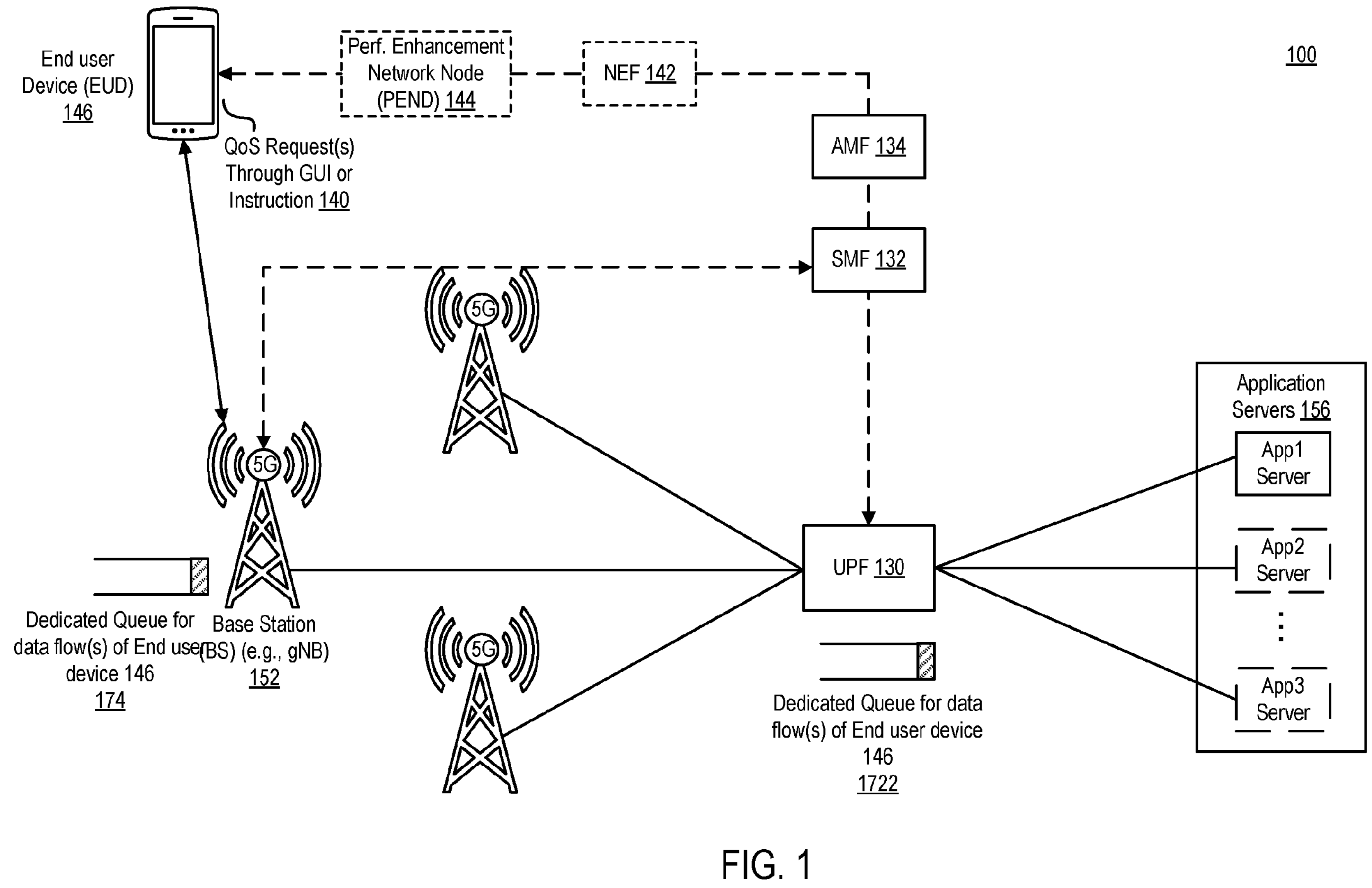
FIG. 1 illustrates an architecture to implement dedicated queues in one or more network nodes in a network per some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Dynamic Boost Service and L4S

As discussed in the Background Art Section, the benefits of Dynamic Boost (also referred to as Dynamic End-User Boost (DEB)) as a service may be constrained by the lack of dedicated resources to accommodate an end user request. Yet Dynamic Boost provides a way for an end user to specify a specific quality-of-service (QoS) requirement for one or more specific applications at a specific time period that is configurable, and such flexibility enhances user experience and saves network resources.

Separately, Low Latency, low loss scalable throughput (L4S) is an Internet service designed to enable scalable congestion controls to keep queuing delay and congestion loss to low levels. Applying L4S shields specific applications from highly variable queuing delay and loss across the Internet while still sharing network capacity with existing traditional Internet traffic.

The deployment of L4S technology includes Internet nodes as well as endpoints. Basically, L4S on Internet nodes will be responsible of explicitly signaling congestion to endpoints by "marking" data packets. Such marking would allow endpoints to re-adjust their congestion window(s) and transmission rates to keep in-network below a certain capacity. When applied to a wireless network implementing the fourth/fifth Generation (4G/5G) infrastructure, L4S enables stable low latency between a sender network node and receiver network node, allowing latency-sensitive applications to attain an optimal or close to optimal performance level.

Yet L4S technology has been deployed by a network operator and without involving the input of end users so far. Because a network operator enables L4S, it tends not to be enabled (1) for a specific end user, (2) for one or more specific applications/data flows of the particular end user, and/or (3) to be implemented during a specific time period that is user/application configurable. The generic enablement of L4S by the network operator not tailored to a specific end user/application/duration also consumes significant network resources and causes unnecessary energy consumption, both of which prevent wider deployment of L4S. For example, L4S may be enabled on a base station such as a 5G base station using new radio (NR) technology (referred to as gNodeB, or gNB), but enabling L4S for all data flows through the base station consumes too much electricity on the base station to be feasible or desirable, since base stations are both numerous and distributed in a cellular network.

Embodiments of the invention incorporate features of both Dynamic Boost and L4S technology to take advantages of these approaches to enable an on-demand performance enhancement (e.g., through L4S capability) with demands being tailored (1) for a specific end user, (2) for one or more specific applications/data flows of the particular end user, and/or (3) to be implemented during a specific time period that is user/application configurable. Such approach may enhance user experience and save network resources as explained in further detail herein.

Architecture to Implement Dedicated Queue(s) Based on User Request

Embodiments of the invention may trigger L4S services for specific one or more data flows of an application, based on either a direct request from an end user and/or a request on behalf of the end user so that the data flows may satisfy one or more QoS requirements. The QoS requirements may be from a request by the end user or from a party (network operator or a third party) based on what is stated in a service level agreement (SLA), and the SLA may be between a variety of parties, e.g., between (1) the end user and (2) a network operator, between (1) the end user and (3) an application or content provider for an application/service to be performed, between (2) the network operator and (3) the application or content provider, or between one of (1) the end user, (2) the network operator, (3) the application or content provider, and (4) another stakeholder of the application/service (e.g., a performance enhancement network node/entity discussed herein), as these entities are involved in and/or responsible for the processing of one or more data flows providing the application/service for the end user.

FIG. 1 illustrates an architecture to implement dedicated queues in one or more network nodes in a network per some embodiments. While network 100 is illustrated as a part of a 5G network, embodiments of the invention may be implemented in a 4G network or another cellular network as well.

Network 100 includes an end user device 146 (e.g., a user equipment (UE)), which issues one or more QoS requests for an application (or corresponding one or more data flows) implemented on the end user device. The QoS requests may be issued through a corresponding end user operating on a graphic user interface (GUI) or sending an instruction as shown at reference 140, where a mobile application (app) of the end user device may provide the GUI or instruction. The mobile app is a part of a performance enhancement service (e.g., Dynamic Boost service) in some embodiments.

The end user may specify a particular QOS request with or without specifying a requested value. For example, the end user may specify that an application to be delivered with minimum latency (without specifying a tolerable latency value) or specify that the application to be delivered with latency to be less than a threshold. The QoS request may also be specified for throughput (e.g., a guaranteed/best effort bandwidth), bit error rate, packet loss rate, jitter, out-of-order delivery, corrupted data, incomplete data, undecodable/unreadable data, or other data processing measurements.

Additionally, the end user may specify one of multiple data flows within the application to be delivered with minimum latency while not requiring the same QoS for other data flows within the same application—e.g., a stream for a live event in a video streaming application may be required to be delivered with minimum latency while another stream for a digital video recorder (DVR) session in the same video streaming application is not (or having another QoS request with lower QoS requirement (e.g., allowing a longer latency).

Furthermore, the end user may specify a specific time period for which the QoS request is to be applied to the specific application/data flow. The specific time period may be the duration of the specific application/data flow, and it may also be a duration specified in the QoS request (e.g., 15 minutes of a data flow). The specific time period can be predetermined and then reconfigured during the processing of the particular application/data flow.

The end user device transmits one or more data flows to a base station 152 (e.g., a gNB in 5G or another base station such as an evolved Node B (eNB) in 4G, NodeB in 3G, base transceiver station (BTS) in 2G). Base station 152 interacts with other entities in a cellular network. When the cellular network implements the fifth generation (5G) standards such as the third Generation Partnership Project (3GPP) standards, it includes multiple core network entities. The architecture in FIG. 1 uses 3GPP network entities as examples to show the interactions within the cellular network, but embodiments of the invention may be applied to earlier versions of the cellular network standards (e.g., 2G to 4G) as well. In the cellular network, base station 152 passes the data flows to user plane function (UPF) 130 and reaches application servers 156 that include one or more application servers (shown as app1 to app3) offered by an application provider to process the data flows for the application. While only one end user device is shown for the end user application, some end user applications involve multiple end users (e.g., multiplayer games), and the data flows will be forwarded between the end user device 146 and the other corresponding end user devices, with or without involving the application servers 156.

The dotted lines with arrows at both ends show signaling messages to request performance enhancement (e.g., L4S capability) by an end user device for one or more data flows of an application. The QoS request may be transmitted after a protocol data unit (PDU) session for the application has been established or prior to the establishment of the PDU session. In some embodiments, a QoS request is transmitted to an access and mobility management function (AMF) 134, which then forwards the QoS request to a session management function (SMF) 132, which subsequently forwards the QoS request to UPF 130.

In other embodiments, a performance enhancement network node 144 (also referred to as a Dynamic Boost backend server or Dynamic End-User Boost (DEB) backend server) is implemented to coordinate performance enhancement services in network 100. Performance enhancement network node 144 takes the QoS requests and forwards them to a network exposure function (NEF) 142, which forwards the QoS requests to AMF 134.

The advantages of implementing performance enhancement network node 144 include minimum impact to an existing network, as performance enhancement network node 144 coordinates the QoS requests while functional modules within the existing network do not need to be changed. Additionally, performance enhancement network node 144 as a standalone entity can be implemented by a third party separated from the operator of network 100 thus providing better security and flexibility of adding performance enhancement as an add-on service.

NEF 142, AMF 134, SMF 132, and UPF 130 may be implemented in one or more network nodes, and performance enhancement network node 144 may be integrated into one network node. When performance enhancement network node 144 is provided by the same vendor providing NEF 142, AMF 134, SMF 132, and UPF 130, one or more functionalities of these modules may be implemented into one or more network nodes. These modules and the transmitted signaling messages between them are discussed in further details relating to FIGS. 3 to 4 herein below.

Note that while these signaling messages are shown to be transmitted directly between the end user device 146 and these network function modules, they are transmitted through base stations in some embodiments. Because base stations do not alter the embedded signaling, the base stations are deemed transparent logically to these messages in these embodiments.

Based on a QoS request for end user device 146, it is determined (e.g., by a network node implementing SMF 132 and/or UPF 130) that the requested QoS can be supported, and a dedicated queue may be implemented at UPF 130 for one or more data flows for which the QoS request is initiated. The dedicated queue is similar to the ones implemented in L4S technology, but a dedicated queue here is enabled based on a QoS request for an end user, instead of being initiated by a network operator as in existing L4S usage, where the network operator may enable the dedicated queue without implementing standard interactions between the network functional modules such as NEF 142, AMF 134, and/or SMF 132.

Thus, packets in the data flows corresponding to the QoS request are stored in the dedicated queue before being processed by UPF 130; and upon a determination of congestion in the network, packets in the queue are marked as candidates to drop to mitigate network congestion and/or reduce latency experienced by the data flows (e.g., if dropping the marked packets would improve the QoS of a data flow as required by the QoS request). The packet drop causes retransmission of the packets, but the QoS of data flow improves due to the marking.

In addition to a dedicated queue at UPF 130, other dedicated queues may also be implemented on other network nodes through which packets of the one or more data flows are processed (network nodes on the user plane). For example, base station 152 is shown as having a dedicated queue for the one or more data flow for which the QoS request is initiated.

While the figure shows that the QoS requests are initiated from an end user device, the QoS requests may be initiated on behalf of the end user device in some embodiments. For example, application servers 156 (or performance enhancement network node 144) may initiate a QoS request (1) for a specific end user, (2) for one or more specified applications/data flows, and/or (3) to be implemented during a specific time period, and such QoS request initiated on behalf of the end user device has the same flexibility as the one initiated from the end user device. When the QoS request is initiated from application servers 156, the request flow of L4S capability will be between UPF 130 and the application servers 156 instead of between UPF 130 and end user device 146.

Through network 100, the performance enhancement service (e.g., L4S service) is provided to an end user on demand, and the demand may be tailored (1) for a specific end user, (2) one or more specific applications/data flows of the particular end user, and/or (3) to be implemented to during a specific time period that is configurable.

Note that network slicing may be implemented in some embodiments. For example, network 100 may be virtualized to become multiple independent logical networks on the same physical network infrastructure. Each network slice is an isolated end-to-end network tailored to fulfill requirements of a particular application, and a slice of the network functional modules (e.g., a UPF slice or a base station slice) are dedicated to particular end users.

Dedicated Queues

As discussed, upon receiving a QoS request, a dedicated queue may be created in some embodiments for one or more data flows identified by the QoS request in a network node implementing UPF 130 (additionally or alternatively, a base station or another network node through which the data flows are processed). The dedicated queue is based on L4S technology in some embodiments. Both L4S and classic congestion control uses explicit congestion notification (ECN) that manages and notifies network congestion. The ECN uses two bits in the header of a packet to notify the presence of congestion. For example, the ECN may use the least significant bits of the type of service (ToS) octet of the IPv4 (Internet Protocol version 4) header, or the least significant bits of the Traffic class field in the IPv6 (IP version 6) header.

Figure 2:
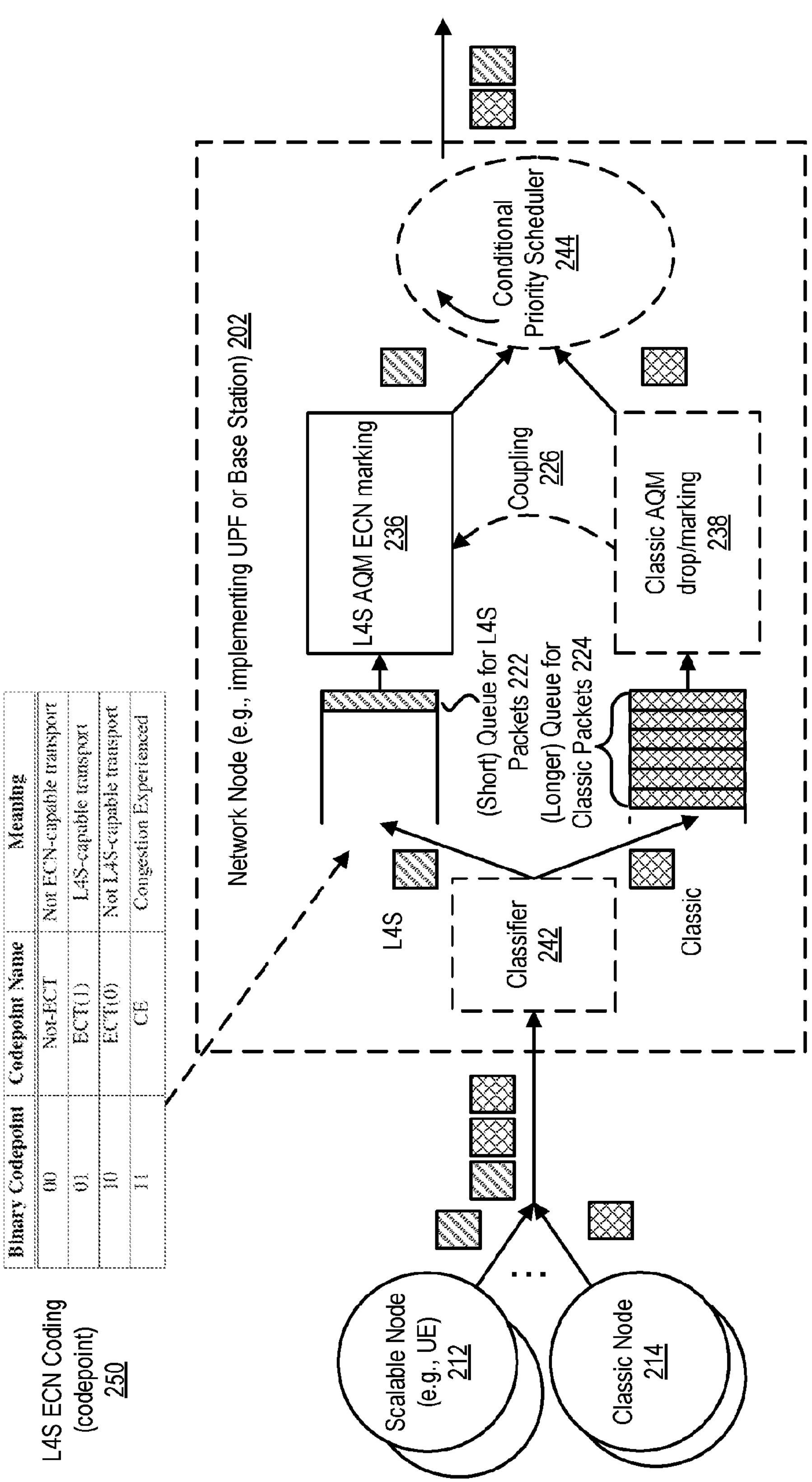
FIG. 2 illustrates dedicated queuing for performance enhancement implemented in a network node per some embodiments.

FIG. 2 illustrates dedicated queuing for performance enhancement implemented in a network node per some embodiments. The network node implementing one or more dedicated queues may be UPF 130 or base station 152, and it receives packets from sending network nodes such as a scalable node 212 and a classic node 214. A network node supporting L4S is referred to as a scalable node (also referred to as scalable sender when it transmits packets to the network node to enable dedicated queues) as L4S provides better congestion control thus more scalable comparing to nodes supporting only classic congestion control (referred to as classic nodes or classic sender).

Network node 202 supports active queue management (AQM) to reduce network congestion and consequently to increase performance by signaling the congestion to congestion-controlled transport protocol (e.g., TCP). Without AQM, when a buffer at a network node for incoming packets becomes full during a network congestion, a new incoming packet will be discarded (referred to as tail drop), and the packet drop increases latency due to retransmission, which further aggravates the congestion. The AQM is implemented differently for packets that support L4S from packets that do not, and classifier 242 may be used to differentiate received packets in some embodiments.

For example, packets from either scalable node 212 or classic node 214 are transmitted to the network node 202. Classifier 242 may identify the type of an incoming packet by inspecting the ECN coding (also referred to as codepoint) of its packet header. For two bits of the ECN coding, four possible permutations indicate different meanings, and ECN coding 250 indicates the coding used by L4S, where bit=00 indicates not ECN-capable transport (non-ECT), bit=01 indicates L4S-capable transport (ECT(1)), bit=10 indicates not-L4S-capable transport (ECT(0)), and bit=11 indicates congestion experienced (CE).

In operation, the sending node is scalable node 212, which signals that packets transmitted from it support L4S by indicating ECT(1) in a packet header of an outgoing packet to network node 202. Classifier 242 within network node 202 recognizes the packet as a L4S packet when it inspects the ECN coding. The packet is then stored in a dedicated queue for L4S packets 222 (L4S queue). When a congestion happens, the congestion is signaled by network node 202 at L4S active queue management (AQM) ECN marking 236, where the ECN coding of the packet is changed to indicate CE. The packet is then scheduled to be transmitted at conditional priority scheduler 244, which transmits the packet to a subsequent receiving node.

The subsequent receiving node inspects the ECN code (e.g., through a classifier similar to classifier 242). If the ECN coding shows that a congestion happened in the path (CE being indicated), the receiving node notifies the sending node (network node 202 if it has changed the ECN bits to indicate CE) about the congestion. The notification may be sent through another packet to the sending node (e.g., based on receiving a packet of a data flow with codepoint CE, transmitting another packet indicating the data flow is experiencing congestion). The sending node reduces its sending rate based on the notification.

On the other hand, if the sending node is classic node 214, the ECN coding of its outgoing packets may indicate ECT (0) (when classic node 214 supports ECN but not L4S capable) or Not-ECT (when classic node 214 does not support ECN). Classifier 242 within network node 202 recognizes the packet is not a L4S packet and won't store in the dedicated queue for L4S 222. Instead, the packet is stored in a queue for classic packets 224 (classic queue), where classic AQM drop/marking 238 performs classic queue management and marking upon congestion. For example, upon congestion, a packet marked with Not-ECT may be dropped, while a packet marked with ECT(0) may be marked as CE. The packets in the queue for classic packets 224 are transmitted through conditional priority scheduler 244, which schedules packets from both class and L4S queues. Conditional priority scheduler 244 may prioritize traffic from the different queues, and they use scheduling schemes such as round robin (RR) or delay based scheduler (DBS). The subsequent receiving node inspects the ECN code and processes the packets from the classic queue based on non-L4S technology.

Note that the two different types of queues are coupled in some embodiments as shown at reference 226. The coupling aims at serving the L4S queue as a higher priority but not exclusively so that packets in the classic queue may also be served (not prioritizing the L4S at the expense of starving the classic queue) in some embodiments. With the coupling of the two queues, network node 202 may offer features such as latency isolation and bandwidth pooling.

By implementing queues and mark/drop packets in the queues, both L4S AQM ECN marking 236 and classic AQM drop/marking 238 may improve throughput, reduce head-of-line blocking, and reduce probability of retransmission timeout (RTO) expiry, yet the two mechanisms operate differently. The classic AQM drop/marking 238, as explained in Internet Engineering Task Force (IETF) Request for Comment (RFC) 3168 dated 2001, may include mechanisms such as random early detection (RED) to (1) drop packets prior to the queue becoming full or (2) set CE codepoint, when the queue size (also referred to as queue length) reaches a threshold—e.g., no packet marking/drop when queue size is below a minimum threshold and always marking/drop above a maximum threshold, and marking/drop according to a probability that depends on the queue size when the queue size is between the two thresholds.

For L4S AQM ECN marking 236, packets in its dedicated queue are not dropped, and a packet in the queue may be marked with codepoint CE in the dedicated L4S queue much sooner (compared to the classic queue). For example, the ECT(1) marking may be based on a shallow threshold described in an IETF draft entitled "DualQ Coupled AQMs for Low Latency, Low Loss and Scalable Throughput (L4S)," dated May 4, 2022. Such shallow threshold may use one or more marking thresholds—for example, a minimum threshold (under which no packets in the queue are marked) to mark packets when a queue size of the L4S queue may, as determined by the network node 202, cause an expected queueing latency to reach a certain value, and a maximum threshold (over which all packets in the queue are marked)

to mark packets when the queue size of the L4S queue may cause the expected queueing latency to reach a higher value. When the queue size of the L4S queue is determined to cause the queueing latency in between the two values, the marking is based on a probability that depends on the queue size.

The threshold values, while reflecting/indicating the queue sizes of the L4S queue in bits/bytes stored within the queue, are often measured based on the link rate of the network node and the thresholds are thus indicated in microseconds to a few milliseconds of queuing latency (e.g., a minimum threshold of 800 μs and a maximum threshold of 5 ms), and the one or more thresholds may be additionally based on a round trip time (RTT) for the packet transmission between transmitting a packet and receiving acknowledgement from receiving the packet (e.g., queueing latency of 0.17 RTT) as proposed in the IETF draft entitled "DualQ Coupled AQMs for Low Latency, Low Loss and Scalable Throughput (L4S)." The thresholds in time can be converted to corresponding thresholds in bits/bytes (e.g., duration*line rate=bits/bytes). In some embodiments, the ultra-low L4S queueing latency of the L4S queue is defined as less than one milliseconds on average and less than about two milliseconds 99% time. Such queueing latency is much lower than that of a classic queue that is often in the tens to hundreds of milliseconds.

The short dedicated L4S queue allows the receiving node to mark the packets in the queue quickly upon a determination of network congestion, and such quicker marking lowers the threshold to mark packets with codepoint CE compared to the classic AQM marking and allows L4S to achieve a lower queue delay.

With a dedicated L4S queue enabled for packets of the one or more data flows corresponding to the QoS request for the end user, the QoS requirement for the one or more data flows can be satisfied using the packet marking, where a receiving node marks packets upon network congestion, and notifies the sending node to slow down thus reducing the network congestion to satisfy the QoS requirement for the one or more data flows.

While FIG. 2 shows a single L4S queue for the packets of the one or more data flows, multiple dedicated L4S queues may be enabled. For example, when multiple data flows are requested to meet a QoS request (e.g., when an application implements the multiple data flows concurrently), multiple corresponding L4S queues may be enabled, each for packets of one data flow corresponding to the QoS request. Additionally, while a single classic queue is shown for packets not from the scalable node 212, the packets for data flows not corresponding to the QoS request may be stored in multiple classic queues (e.g., packets with codepoint Not-ECT and ECT(0) may be stored in different queues) to provide more QoS service granularities. Note while L4S queues are used as an example to explain the dedicated queue for QoS requests herein, the dedicated queues for QoS requests may use other performance enhancement technologies as well.

Implement Dedicated Queue(s) Based on User Request in a 3GPP System

As shown in FIG. 1, 3GPP network entities may be utilized to implement the dedicated L4S queues in a cellular network. The interactions between the 3GPP network entities per some embodiments are explained in further details herein below.

Figure 3:
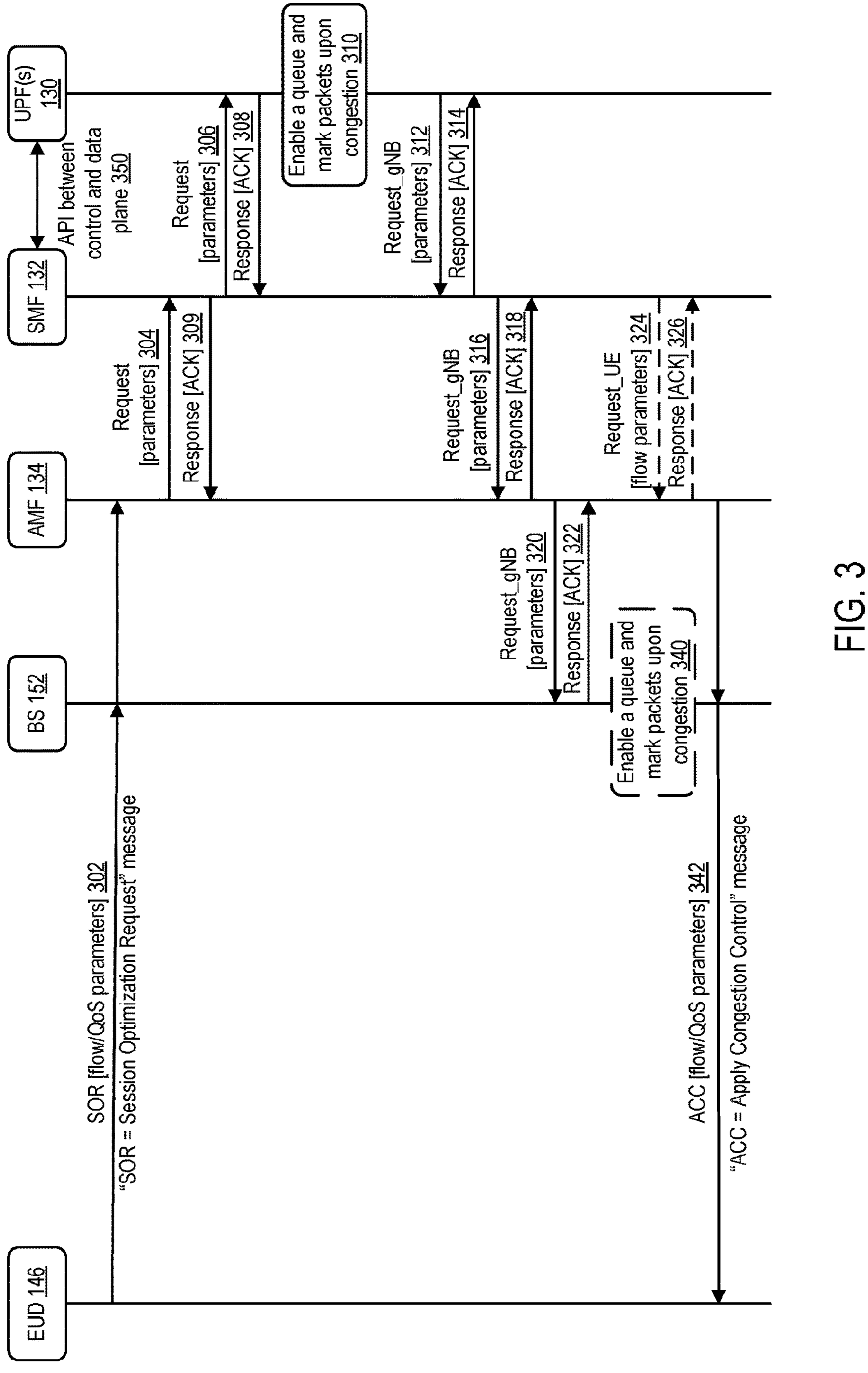
FIG. 3 illustrates operations to implement dedicated queues per some embodiments.

FIG. 3 illustrates operations to implement dedicated queues per some embodiments. The operations are performed among end user device 146, base station 152, AMF 134, SMF 132, and UPF 130. While end user device 146 and base station 152 are discussed herein above, AMF 134, SMF 132, and UPF 130 are discussed in more detail herein below.

AMF 134 implements a control plane function, and it allows an end user device (e.g., a UE) to register, to be authenticated, and to move between different cells of a cellular network. SMF 132 implements the function responsible for setting up connectivity between the end user device and the external data network (DN) (e.g., Internet), where the function manages the user plane connectivity, controls the user session (establishment, modification, and release), and allocates the IP for a protocol data unit (PDU) session. SMF 132 communicates indirectly to the end user device 146 through AMF 134.

UPF(s) 130 may implement one or more UPF entities, each being a slice for a particular logical network (e.g., the logical networks being implemented through network slicing). A UPF 130 is responsible for a user plane (also referred to as data plane); and it connects to the control plane through SMF 132, and the interaction between the user plane (UPF) and control plane (SMF) may be through an application programming interface (API) as shown at reference 350 and such separation of user and control planes provides better modulation and security.

UPF(s) 130 also connect to the radio access network (RAN) and the external data network (DN). The RAN and the end user device 146 are connected to the control plane through AMF 134. Note that UPF(s) 130 deal with the management of QoS, routing, and forwarding of user data (e.g., packets of data flows to the end user device 146). A UPF 130 is one endpoint of a general packet radio service (GPRS) tunneling protocol (GTP) tunnel, and it encapsulates the packets arriving from the external DN and sends them toward the end user device 146 (e.g., through the base station 152).

At reference 302, end user device 146 may transmit a session optimization request (SOR) message with parameters, through base station 152 to reach AMF 134. The SOR message may identify a set of QoS parameters including one or more of latency, throughput (e.g., a guaranteed/best effort bandwidth), bit error rate, packet loss rate, jitter, out-of-order delivery, corrupted data, incomplete data, undecodable/unreadable data, and/or other data processing measurements for a PDU session. Additionally, the SOR message may also specify a set of flow parameters, such as an application for which the PDU session is established, or one or more data flows within the application for which the QoS parameters are to be applied. Furthermore, the flow parameters may also specify a duration during which the QoS parameters are to be applied to the application or one or more data flows within the application. An application may be identified with an application identifier (ID), user ID, and/or another identification; and data flows within the application may be identified through 5-tuple (source IP address/port number, destination IP address/port number and the protocol in use), 3-tuple (source IP address, source port number, and protocol number), or another way to differentiate each data flow.

Upon receiving the SOR message, AMF 134 transmits a request to SMF 132 at reference 304. The request may embed all or a subset of the parameters received from end user device 146. The request may include information added by AMF 134. Upon receiving the request, SMF 132 may acknowledge the request with a response at reference 309. When no acknowledgement is received, AMF 134 may retransmit the request.

Upon receiving the request, SMF 132 transmits a request to UPF(s) 130, where the request may embed all or a subset of the parameters received from end user device 146 and include information added by SMF 132. Upon receiving the request, UPF(s) 130 may acknowledge the request with a response at reference 308. When no acknowledgement is received, SMF 132 may retransmit the request.

At reference 310, based on the received request, UPF(s) 130 enable a queue that is dedicated to the application or one or more data flows within the application corresponding to the SOR message (e.g., the queue may be the L4S queue 222). The queue is enabled in a network node implementing UPF(s) 130. When a network congestion is detected at UPF(s) 310, UPF(s) 310 marks packets within the dedicated queue, e.g., with codepoint CE.

UPF(s) 130 may also notify other network entities about the SOR message so that other network entities on the user plane may enable dedicated queues for the application or one or more data flows within the application corresponding to the SOR message. UPF(s) 130 do so as they deal with the management of QoS, routing, and forwarding of user data.

In this example, UPF(s) 130 notify base station 152 about the SOR message as base station 152 processes user data from end user device 146. At reference 312, UPF(s) 130 transmit a request to SMF 132 toward base station 152 at reference 312, including all or a subset of the parameters received from end user device 146. Assuming base station 152 comprises a gNB, the request is in the format of Request_gNB [parameters]. At reference 316, SMF 132 in turn transmits a request to AMF 134, which responsively transmits a request to base station 152 at reference 320. In some embodiments, SMF 132 sends a message at reference 324 to AMF 134, indicating that the dedicated queue is enabled in response to the SOR message at reference 302. Each receiving network entity may respond to receiving a request by transmitting an acknowledgement, as shown at reference 314, 318, 322, and 326.

Base station 152, upon receiving the request at reference 320, may enable a dedicated queue in base station 152 that is dedicated to the application or one or more data flows within the application corresponding to the SOR message, and upon a determination of network congestion at base station 152, base station 152 marks packets within the dedicated queue, e.g., with codepoint CE. The enablement of the queue at base station 152 is optional and based on condition and resource availability at base station 152.

At reference 342, an apply congestion control (ACC) message is returned to end user device 146, indicating the result of the SOR message. The ACC messages may include flow and QoS parameters discussed above. The ACC message may incorporate information received from the Request_UE message 324 when that is received. The ACC message may indicate which network node(s) have enabled dedicated queues for the application or one or more data flows within the application corresponding to the SOR message, and the parameters accepted by the network node(s). In some embodiments, the end user device 146 may negotiate with the network node(s) and agree on a set of QoS parameters that are different from the ones in the SOR message. Such agreed parameters will be provided to the end user device 146 instead of the QoS parameters in the SOR message.

The ACC message provides a response to the SOR message and allows the end user to be aware of the dedicated queues, for which the end user may be charged for. While FIG. 3 shows an ACC message for successfully implementing dedicated queues based on the SOR message, an ACC message for failed attempt in response to the SOR message may be returned as well, and that ACC message may indicate the reason for the failure in that case. Additionally, additional ACC messages may be transmitted to the end user device 146 once the dedicated queues are removed (e.g., when the PDU session for the application or data flows within the application is terminated or the duration specified in the SOR message is completed). The different types of ACC messages in response to the SOR message provide the end user sufficient status update about the congestion control and enhance user experience.

Note while the SOR message is shown to be initiated from end user device 146, the SOR message may be initiated from another party (network operator or a third party) based on an SLA as well, as discussed herein above.

Figure 4:
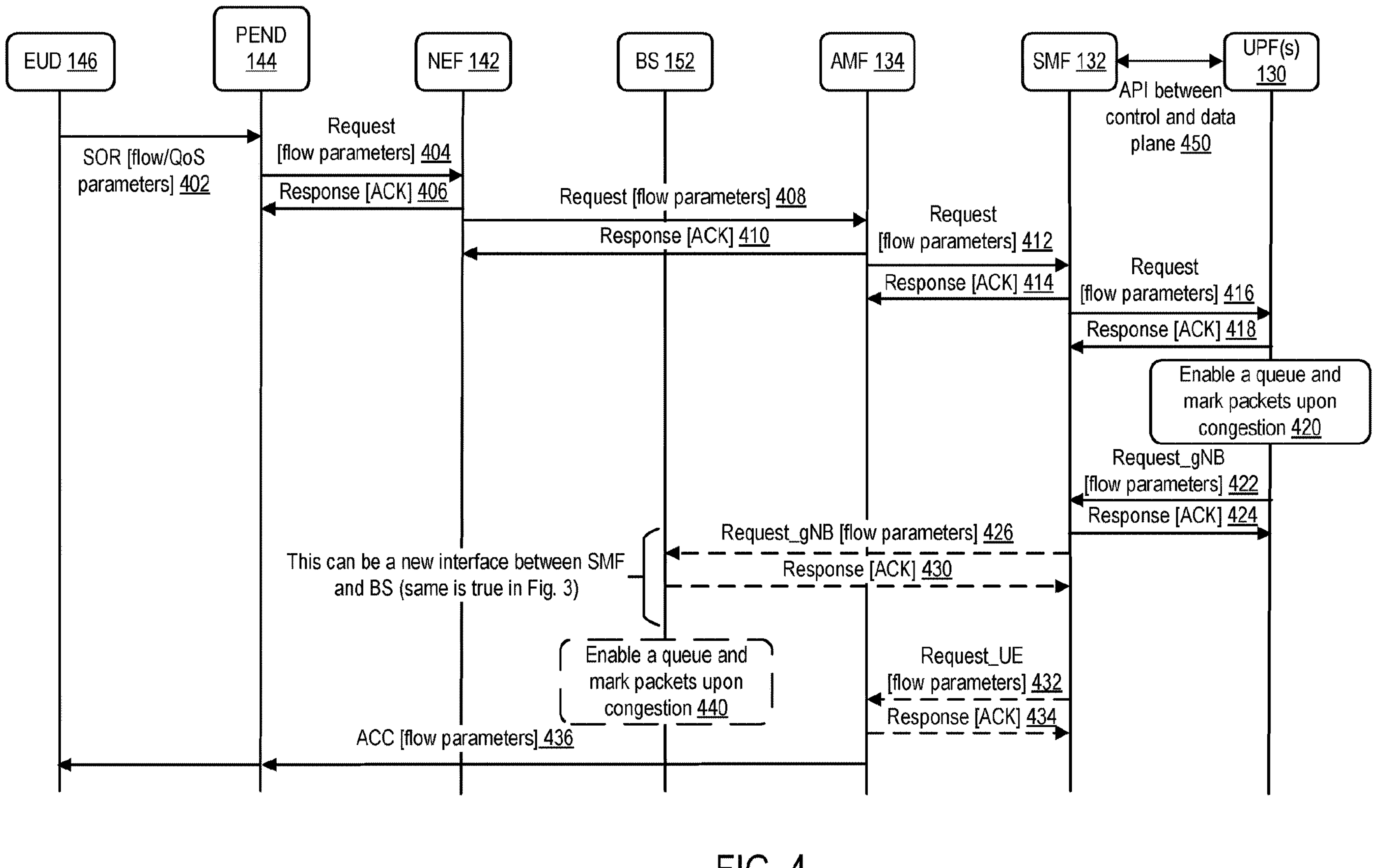
FIG. 4 illustrates operations to implement dedicated queues per some other embodiments.

In FIG. 3, the SOR message is shown as being transmitted to AMF 134 without another network function involved in between. Yet as discussed herein above relating to FIG. 1, a cellular network may implement a performance enhancement network node (e.g., performance enhancement network node 144) to accept QoS requests. FIG. 4 illustrates operations to implement dedicated queues per some other embodiments. FIG. 4 is similar to FIG. 3, but with additional network functional modules, including performance enhancement network node 144 and NEF 142.

As discussed herein above, performance enhancement network node 144 takes a QoS request (e.g., SOR message 402) and forwards it to a network exposure function (NEF) 142, which forwards the QoS requests to AMF 134. NEF 142 implements an API framework to allow a third party separated from the operator of network 100 to provide the performance enhancement based on the SOR message. The transmission of requests and response to such transmission are shown in FIG. 4 and they are similar to the network functional entities as shown in FIG. 3. One variation shown in FIG. 4 is that an interface may be specified for communication between SMF 132 and base station 152, and the interface may be used to transmit request 426 and response 430 (e.g., skipping AMF 134 as an intermediary as shown in FIG. 3). Such interface may be implemented in FIG. 3 as well, in which case SMF 132 may transmit its request to base station 152 (instead of AMF 134 as shown in FIG. 3).

Another difference in FIG. 4 is that the ACC message may be transmitted to performance enhancement network node 144 first, which then relays the ACC message to the end user device 146. Through the receipt and relay, performance enhancement network node 144 may track status of performance enhancement operations in the network and it may charge the end user and/or the network operator based on the SOR and ACC messages for the services that performance enhancement network node 144 provides.

Note that while NEF 142 is shown as the intermediary between performance enhancement network node 144 and AMF 134 for transmitting SOR messages, in alternative embodiments, a network node implementing Service Capability Exposure Function (SCEF) may be used to serve as the intermediary as SCEF, which provides a means to securely expose the services and capabilities provided by 3GPP network interfaces thus can replace NEF 142 to serve the SOR messages.

Operations Per Some Embodiments

Figure 5:
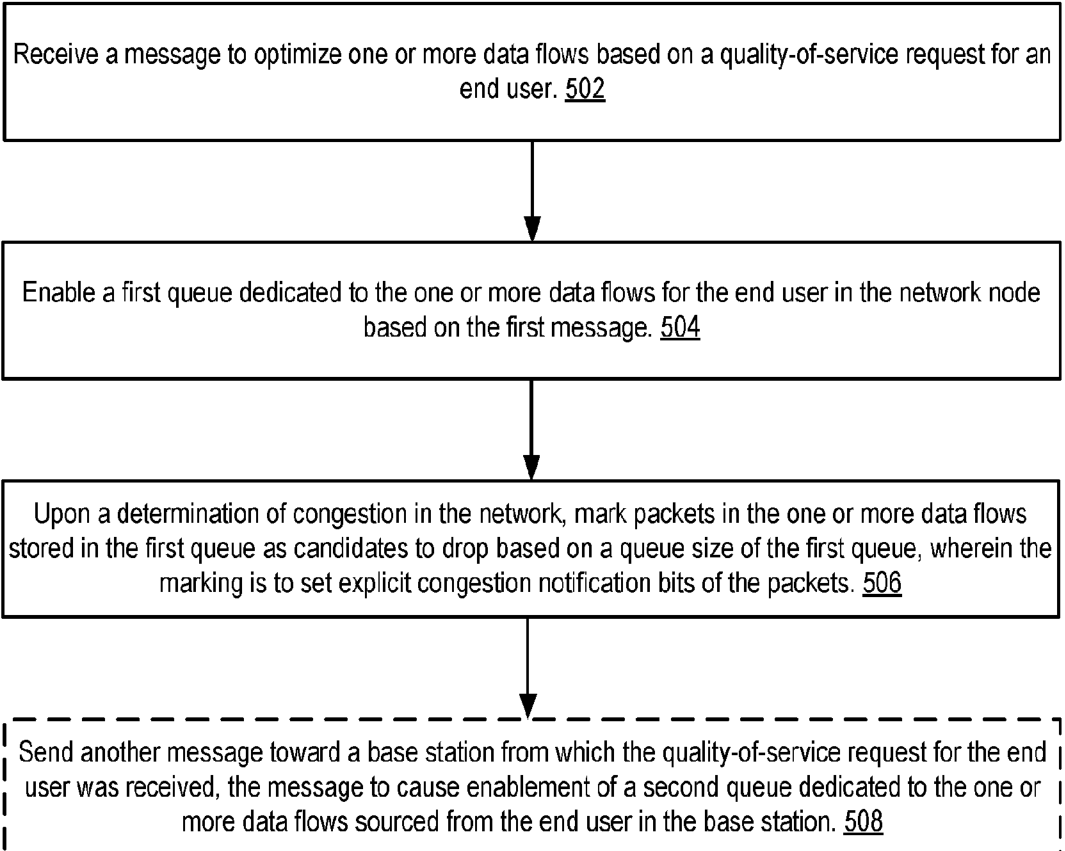
FIG. 5 is a flow diagram illustrating operations to implement dedicated queues per some embodiments.

FIG. 5 is a flow diagram illustrating operations to implement dedicated queues per some embodiments. The operations of method 500 may be implemented in a network node (e.g., a network node implementing UPF 130 or base station 152).

At reference 502, the network node receives a first message to optimize one or more data flows based on a quality-of-service request for an end user. The first message may be a QoS request or a SOR message discussed herein above.

At reference 504, the network node enables a first queue dedicated to the one or more data flows for the end user in the network node based on the first message. The first queue dedicated to the one or more data flows is a L4S queue discussed herein in some embodiments. The packets in the one or more data flows are then stored in the first queue. The network node may identify packets in the one or more data flows based on the ECN code indicated in the packet header of a packet, as classifier 242 does.

At reference 506, upon a determination of congestion in the network, the network node marks packets in the one or more data flows stored in the first queue as candidates to drop based on a queue size of the first queue, where the marking is to set explicit congestion notification bits of the packets. The marking based on the queue size is discussed herein above, e.g., relating to FIG. 2 and the one or more thresholds set to mark packets.

In some embodiments, the first queue dedicated to the one or more data flows are implemented for a user plane function (UPF) of the network node of the network implementing the fifth generation (5G) standards, the UPF causes enablement of the first queue in response to the first message.

In some embodiments, the first message is received from a session management function (SMF) of the network, and wherein the SMF transmitted the first message to the UPF in response to receiving a second message from an access and mobility management function (AMF).

In some embodiments, the AMF transmits the second message to the SMF in response to receiving the quality-of-service request from a base station from which the quality-of-service request for the end user was received.

In some embodiments, the AMF transmits the second message to the SMF in response to receiving a third message from a network exposure function (NEF), wherein the NEF transmits the third message in response to receiving a fourth message from a performance enhancement network node, and wherein the performance enhancement network node transmits the fourth message in response to receiving the quality-of-service request for the end user.

In some embodiments, the network node sends another message (a fifth message) toward a base station from which the quality-of-service request for the end user was received, the other message to cause enablement of a second queue dedicated to the one or more data flows sourced from the end user in the base station.

In some embodiments, the other message is transmitted to a session management function (SMF) of the network, wherein the SMF transmitted a sixth message to an access and mobility management function (AMF) in response to receiving the fifth message from the UPF, and where the AMF transmits a seventh message to the base station from which the quality-of-service request for the end user was received in response to receiving the sixth message.

In some embodiments, the fifth message is transmitted to a session management function (SMF) of the network, where the SMF transmitted an eighth message to the base station from which the quality-of-service request for the end user was received in response to receiving the eighth message. In these embodiments, the communication to the base station skips the AMF as an intermediary as discussed herein above.

In some embodiments, the quality-of-service request for the end user specifies a latency improvement (e.g., with or without specified latency value) or throughput improvement (e.g., with or without a guaranteed/best effort bandwidth).

In some embodiments, the quality-of-service request from the end user specifies at least one of: a duration during which the optimization is to be implemented for the one or more data flows, and an application for which the optimization is to be implemented for the one or more data flows.

In some embodiments, the quality-of-service request for the end user is initiated from an end user electronic device. Alternatively or additionally, the quality-of-service request for the end user is initiated by an application server on behalf of the end user.

Through these embodiments, a network may implement an on-demand performance enhancement through setting explicit congestion notification bits of packets, and that extends the performance enhancement technology such as L4S to be tailored for a specific end user, (2) one or more specific applications/data flows of the particular end user, and/or (3) to be implemented during a specific time period that is configurable, and such flexibility enhances user experience and saves network resources.

Devices Implementing Embodiments of the Invention

Figure 6:
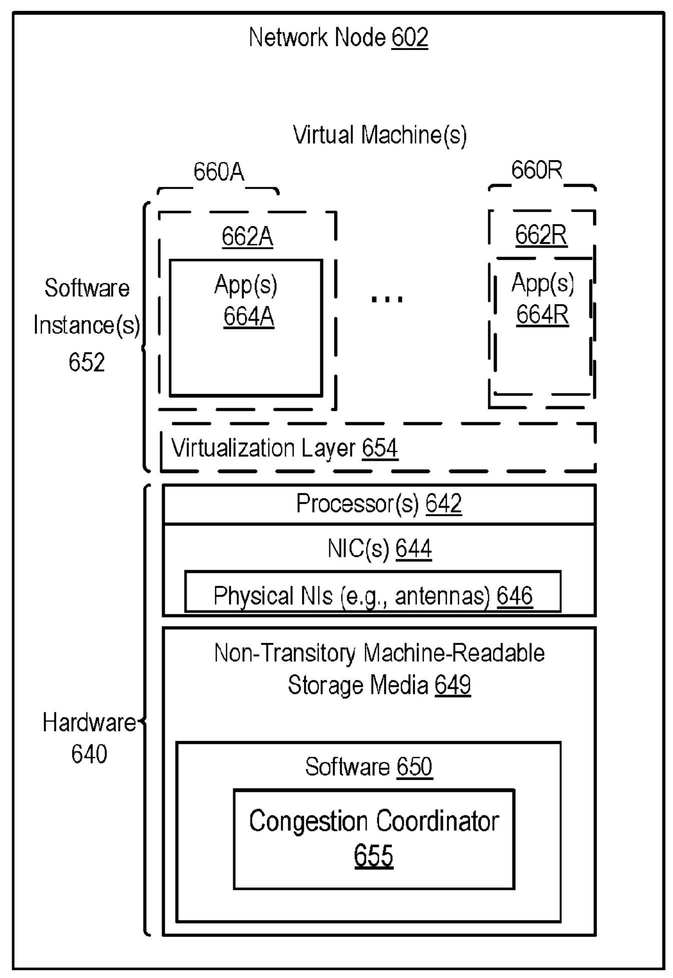
FIG. 6 illustrates a network node implementing dedicated queues per some embodiments.

FIG. 6 illustrates a network node implementing dedicated queues per some embodiments. The network node 602 may be implemented using custom application-specific integrated-circuits (ASICs) as processors and a special-purpose operating system (OS), or common off-the-shelf (COTS) processors and a standard OS. In some embodiments, the network node 602 implements UPF 130 or base station 152.

The network node 602 includes hardware 640 comprising a set of one or more processors 642 (which are typically COTS processors or processor cores or ASICs) and physical NIs 646, as well as non-transitory machine-readable storage media 649 having stored therein software 650. During operation, the one or more processors 642 may execute the software 650 to instantiate one or more sets of one or more applications 664A-R. While one embodiment does not implement virtualization, alternative embodiments may use different forms of virtualization. For example, in one such alternative embodiment, the virtualization layer 654 represents the kernel of an operating system (or a shim executing on a base operating system) that allows for the creation of multiple instances 662A-R called software containers that may each be used to execute one (or more) of the sets of applications 664A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment, the virtualization layer 654 represents a hypervisor (sometimes referred to as a virtual machine monitor (VMM)) or a hypervisor executing on top of a host operating system, and each of the sets of applications 664A-R run on top of a guest operating system within an instance 662A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels, and sets of applications that are run in different software containers).

The software 650 contains a congestion coordinator 655 that performs operations described with reference to method 500 and/or network 100 as shown in FIGS. 1 to 5. The congestion coordinator 655 may be instantiated within the applications 664A-R. The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual electronic device 660A-R.

A network interface (NI) may be physical or virtual. In the context of IP, an interface address is an IP address assigned to an NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address).

A Wireless Network Per Some Embodiments

Figure 7:
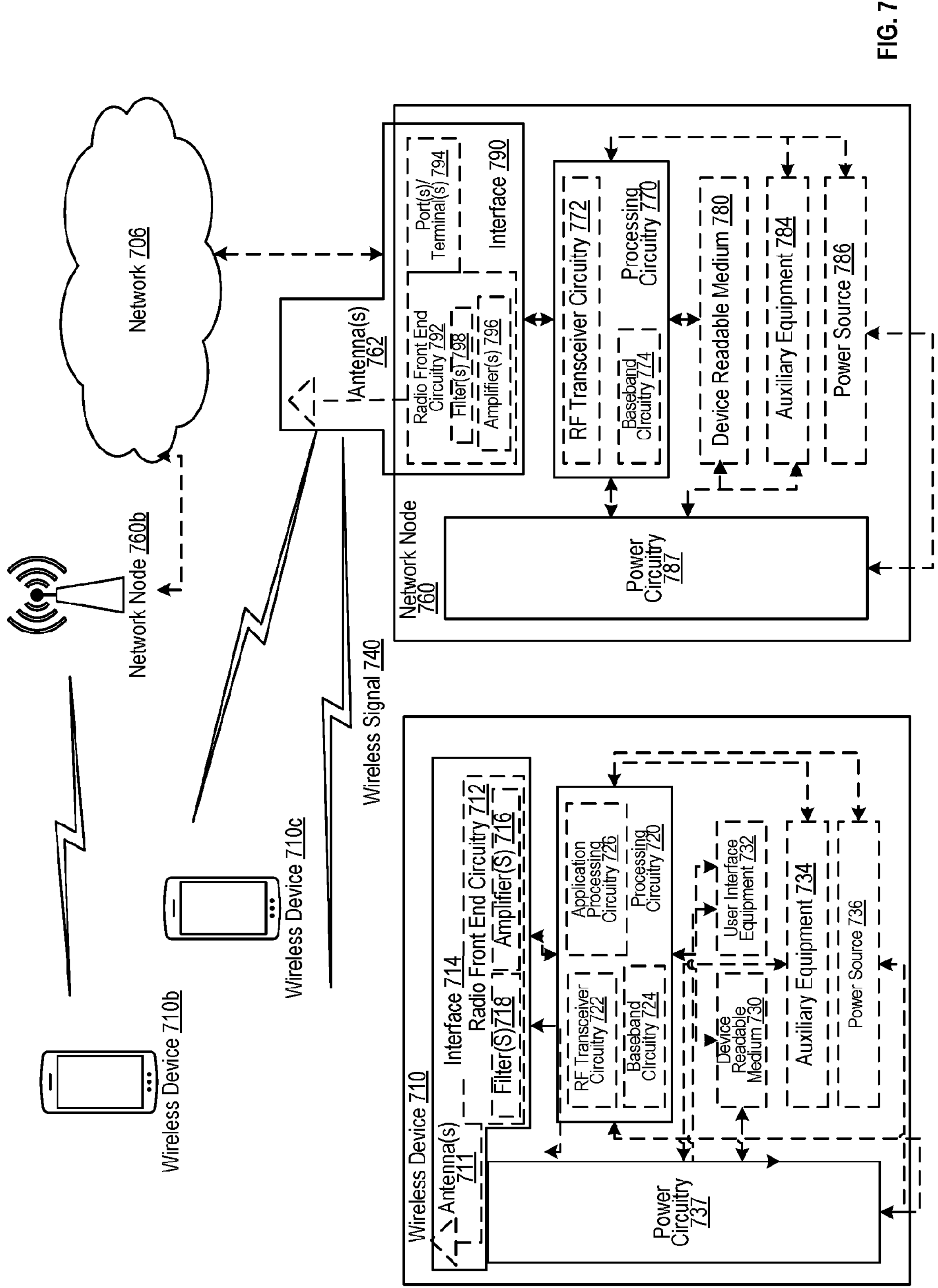
FIG. 7 illustrates a wireless network per some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760*b*, and WDs 710, 710*b*, and 710*c*. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network. A network node 760 may implement dedicated queues through the congestion coordinator 655 that performs operations described with reference to method 500 and/or network 100 as shown in FIGS. 1 to 5.

The wireless network may comprise of and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the Institute of Electrical and Electronics Engineers (IEEE) 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and new radio (NR) NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., mobile switching centers (MSCs), mobility management entities (MMEs)), operational and management (O & M) nodes, operation support system (OSS) nodes, self-optimized network (SON) nodes, positioning nodes (e.g., Evolved Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, Wideband Code Division Multiple Access (WCDMA), LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units.

In certain embodiments, some or all of the functionality described herein as being provided by a network node, base station, eNB, or other such network device may be performed by processing circuitry 770 executing instructions stored on device readable medium 780 or memory within processing circuitry 770. In alternative embodiments, some or all of the functionalities may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760 but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data, or information, including a computer program, software, an application including one or more of logic, rules, code, tables, etc., and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector, or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as multiple-input and multiple-output (MIMO). In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data, and/or signals may be received from a wireless device, another network node and/or any other network equipment. Similarly, antenna 762, interface 790, and/or processing circuitry 770 may be configured to perform any transmitting operations described herein as being performed by a network node. Any information, data, and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged, and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736, and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data, and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprises one or more filters 718 and amplifiers 716. Radio front end circuitry 714 is connected to antenna 711 and processing circuitry 720 and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined on the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionalities may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc., and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices, and circuits, and output interfaces, devices, and circuits. User interface equipment 732 is configured to allow input of information into WD 710 and is connected to processing circuitry 720 to allow processing circuitry 720 to process the input information. User interface equipment 732 may include, for example, a microphone, a proximity or other sensor, keys/buttons, a touch display, one or more cameras, a universal serial bus (USB) port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications, etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

User Equipment Per Some Embodiments

Figure 8:
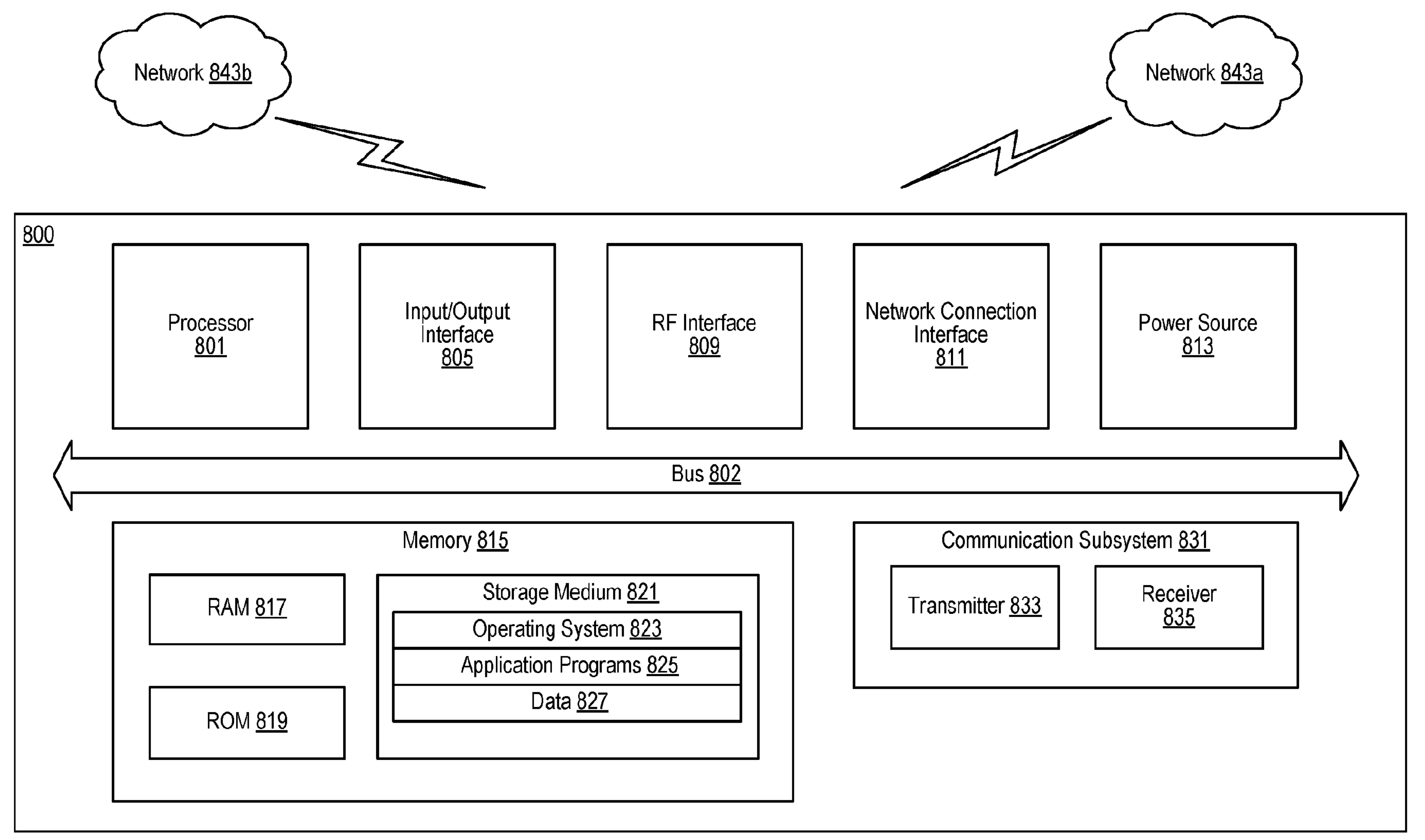
FIG. 8 illustrates a user equipment per some embodiments.

FIG. 8 illustrates one embodiment of a UE per some embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the 3$^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, field-programmable gate array (FPGA), ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network, or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, synchronous optical network (SONET), Asynchronous Transfer Mode (ATM), or the like. Network connection interface 811 may implement receiver and transmitter functionality appropriate to the communication network links (e.g., optical, electrical, and the like). The transmitter and receiver functions may share circuit components, software, or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UMTS Terrestrial Radio Access Network (UTRAN), WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software, or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits, and/or functions described herein may be implemented in one of the components of UE 800 or partitioned across multiple components of UE 800. Further, the features, benefits, and/or functions described herein may be implemented in any combination of hardware, software, or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Virtualization Environment Per Some Embodiments

Figure 9:
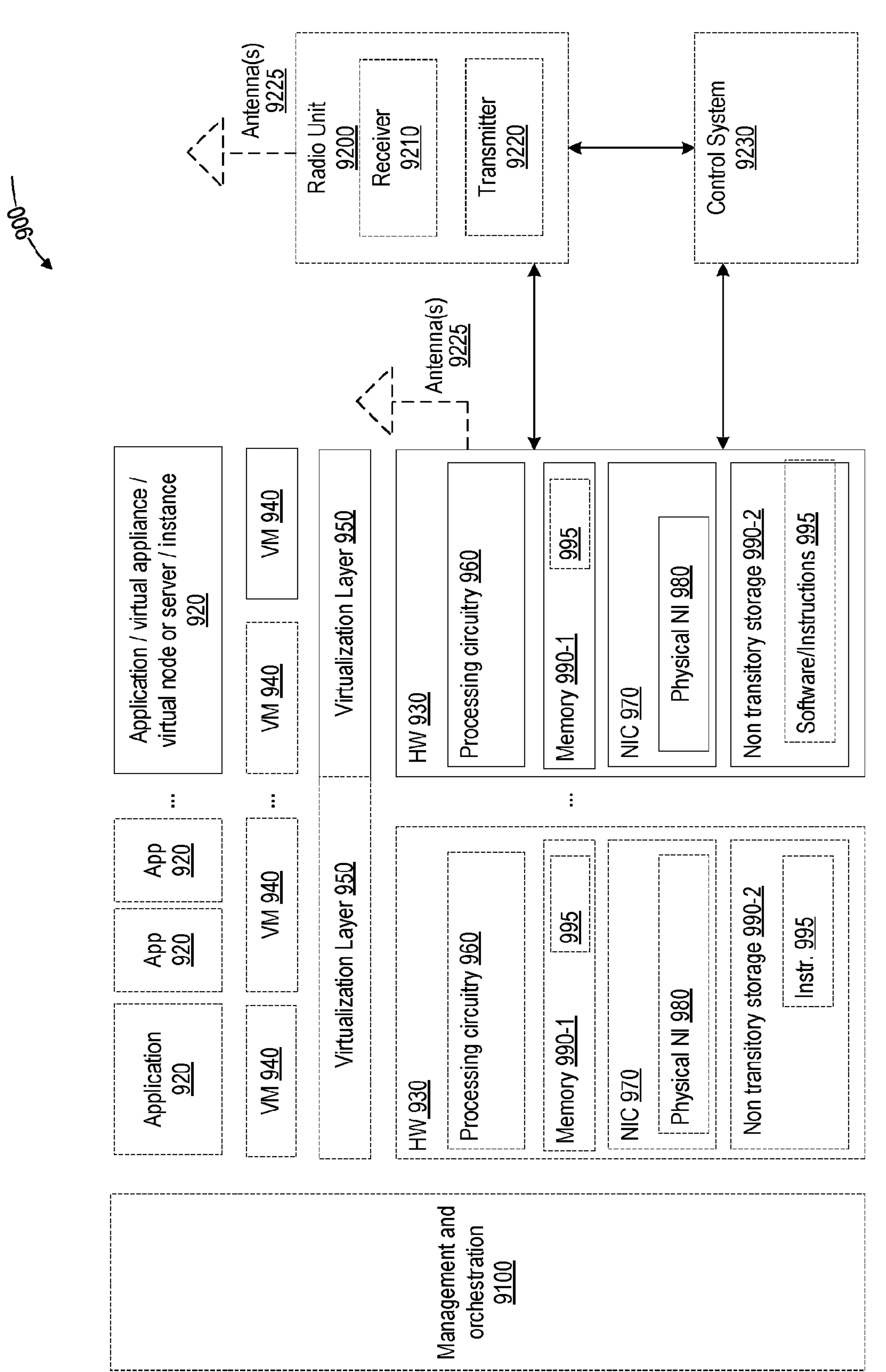
FIG. 9 is a schematic block diagram illustrating a virtualization environment in which functions implemented by some embodiments may be virtualized.

FIG. 9 is a schematic block diagram illustrating a virtualization environment in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features, and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g., such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network element (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
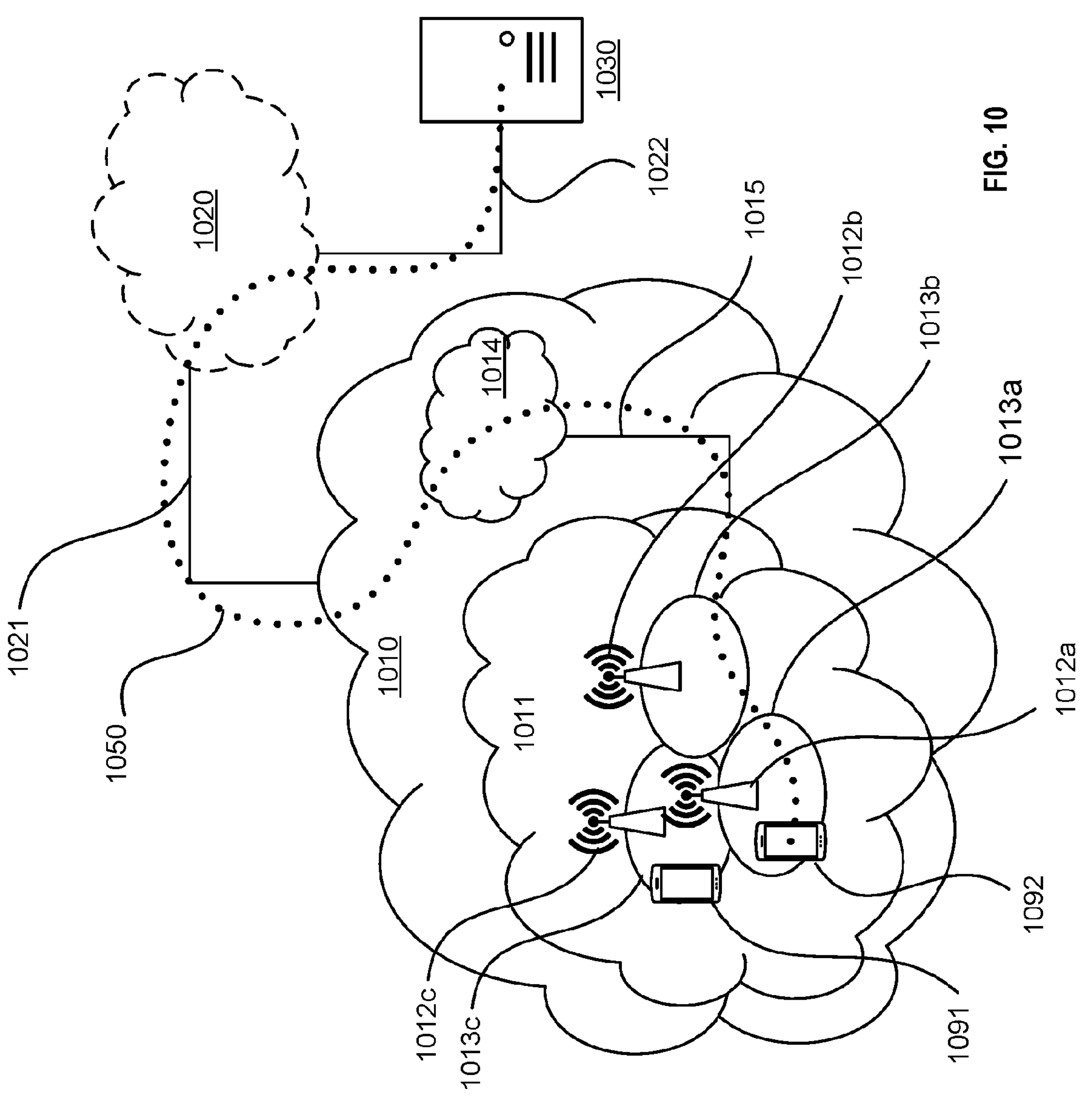
FIG. 10 illustrates a telecommunication network connected via an intermediate network to a host computer per some embodiments.

Telecommunication Network Connected via an Intermediate Network to a Host Computer With reference to FIG. 10, per an embodiment, a communication system includes telecommunication network 1010, such as a 3GPP-type cellular network, which comprises access network 1011, such as a radio access network, and core network 1014. Access network 1011 comprises a plurality of base stations 1012*a*, 1012*b*, 1012*c*, such as NBs, eNBs, gNBs, or other types of wireless access points, each defining a corresponding coverage area 1013*a*, 1013*b*, 1013*c*. Each base station 1012*a*, 1012*b*, 1012*c* is connectable to core network 1014 over a wired or wireless connection 1015. A first UE 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private, or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Host Computer Communicating via a Base Station With a User Equipment Over a Partially Wireless Connection Per Some Embodiments Example implementations, per an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays, or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150. In some embodiments, host computer 1110 implements performance enhancement network node 144 discussed herein above.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays, or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays, or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides. In some embodiments, client application 1122 may be the application that initiate the QoS request discussed herein above.

Figure 11:
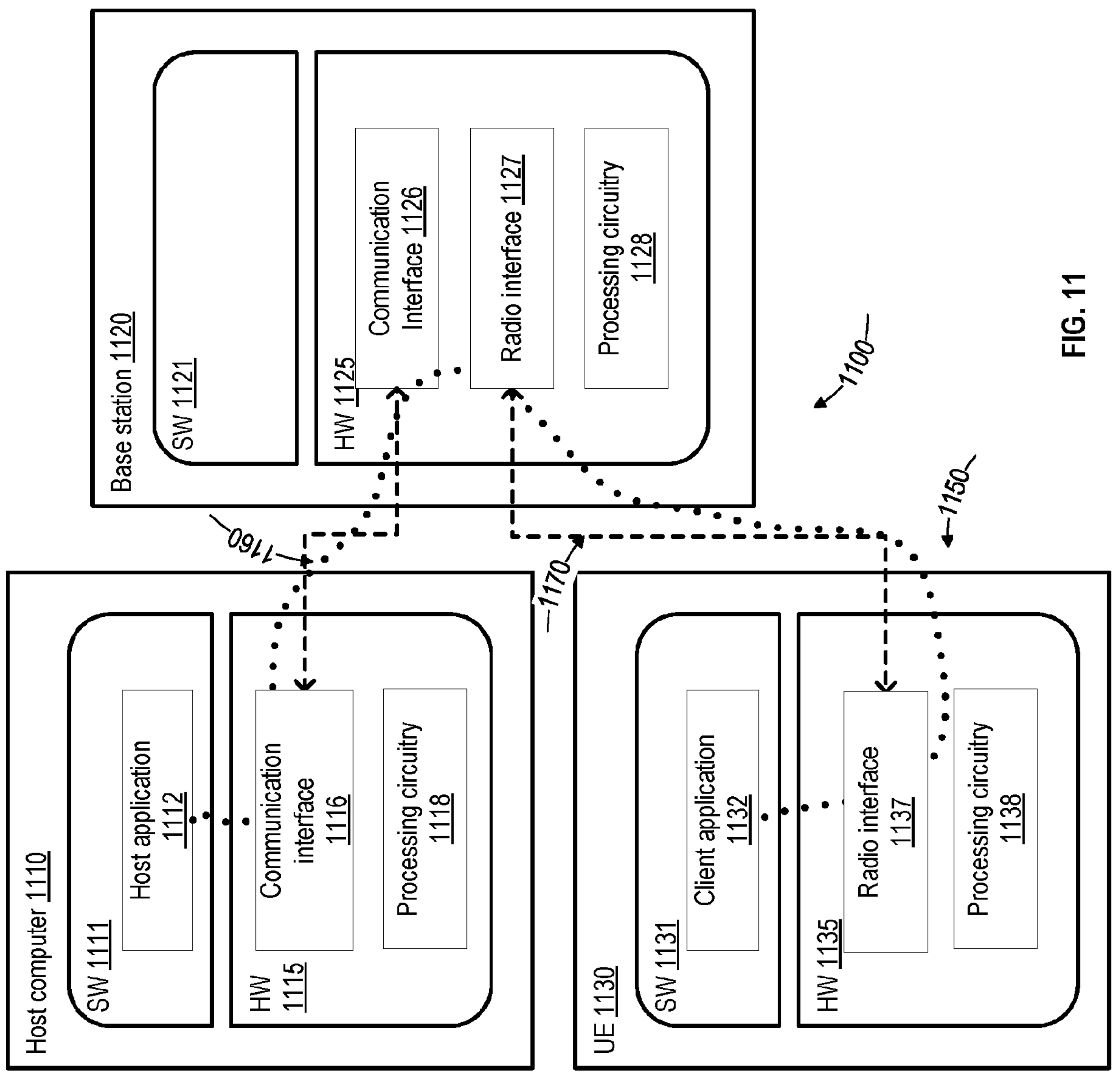
FIG. 11 illustrates a host computer communicating via a base station with a user equipment over a partially wireless connection per some embodiments.

It is noted that host computer 1110, base station 1120, and UE 1130 illustrated in FIG. 11 may be similar or identical to host computer 1030, one of base stations 1012*a*, 1012*b*, 1012*c*, and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is per the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the performance enhancement through setting explicit congestion notification bits of packets.

A measurement procedure may be provided for the purpose of monitoring data rate, latency, and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing, etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency, and the like. The measurements may be implemented in that software 1111 and 1131 causes messages to be transmitted, in particular empty or 'dummy' messages, using OTT connection 1150 while it monitors propagation times, errors, etc.

Some of the embodiments contemplated herein above are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Terms

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to an NIC. One or more parts of an embodiment of the invention may be implemented using different combinations of software, firmware, and/or hardware.

A network node (also referred as network device or simply node) is an electronic device that communicatively interconnects other electronic devices on the network (e.g., other network devices, end-user devices). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video).

The terms "module," "logic," and "unit" used in the present application, may refer to a circuit for performing the function specified. In some embodiments, the function specified may be performed by a circuit in combination with software such as by software executed by a general purpose processor.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method to be implemented in a network node of a network, comprising:

receiving a first message to optimize one or more data flows based on a quality-of-service request for an end user;

enabling a first queue dedicated to the one or more data flows sourced for the end user in the network node based on the first message; and upon a determination of congestion in the network, marking packets in the one or more data flows stored in the first queue as candidates to drop based on a queue size of the first queue, wherein the marking is to set explicit congestion notification bits of the packets.

2. The method of claim 1, wherein the first queue dedicated to the one or more data flows are implemented for a user plane function (UPF) of the network node of the network implementing the fifth generation (5G) standards, the UPF causes enablement of the first queue in response to the first message.

3. The method of claim 2, wherein the first message is received from a session management function (SMF) of the network, and wherein the SMF has transmitted the first message to the UPF in response to receiving a second message from an access and mobility management function (AMF).

4. The method of claim 3, wherein the AMF transmits the second message to the SMF in response to receiving the quality-of-service request from a base station from which the quality-of-service request for the end user was received.

5. The method of claim 3, wherein the AMF transmits the second message to the SMF in response to receiving a third message from a network exposure function (NEF), wherein the NEF transmits the third message in response to receiving a fourth message from a performance enhancement network node, and wherein the performance enhancement network node transmits the fourth message in response to receiving the quality-of-service request for the end user.

6. The method of claim 5, further comprising:

sending a fifth message toward a base station from which the quality-of-service request for the end user was received, the fifth message to cause enablement of a second queue dedicated to the one or more data flows sourced from the end user in the base station.

7. The method of claim 6, wherein the fifth message is transmitted to a session management function (SMF) of the network, wherein the SMF has transmitted a sixth message to an access and mobility management function (AMF) in response to receiving the fifth message, and wherein the AMF transmits a seventh message to the base station from which the quality-of-service request for the end user was received in response to receiving the sixth message.

8. The method of claim 7, wherein the fifth message is transmitted to a session management function (SMF) of the network, wherein the SMF has transmitted an eighth message to the base station from which the quality-of-service request for the end user was received in response to receiving the eighth message.

9. The method of claim 1, wherein the quality-of-service request for the end user specifies a latency improvement or throughput improvement.

10. The method of claim 1, wherein the quality-of-service request from the end user specifies at least one of:

a duration during which the optimization is to be implemented for the one or more data flows; and an application for which the optimization is to be implemented for the one or more data flows.

11. The method of claim 1, wherein the quality-of-service request for the end user is initiated from an end user electronic device.

12. The method of claim 1, wherein the quality-of-service request for the end user is initiated by an application server on behalf of the end user.

13. A network node, comprising:

a processor and non-transitory machine-readable storage medium that provides instructions that, when executed by the processor, are capable of causing the processor to perform:

receiving a first message in a network to optimize one or more data flows based on a quality-of-service request for an end user;

enabling a first queue dedicated to the one or more data flows sourced for the end user in the network node based on the first message; and upon a determination of congestion in the network, marking packets in the one or more data flows stored in the first queue as candidates to drop based on a queue size of the first queue, wherein the marking is to set explicit congestion notification bits of the packets.

14. The network node of claim 13, wherein the first queue dedicated to the one or more data flows are implemented for a user plane function (UPF) of the network node of the network implementing the fifth generation (5G) standards, the UPF causes enablement of the first queue in response to the first message.

15. The network node of claim 14, wherein the first message is received from a session management function (SMF) of the network, and wherein the SMF has transmitted the first message to the UPF in response to receiving a second message from an access and mobility management function (AMF).

16. The network node of claim 15, wherein the AMF transmits the second message to the SMF in response to receiving the quality-of-service request from a base station from which the quality-of-service request for the end user was received.

17. The network node of claim 15, wherein the AMF transmits the second message to the SMF in response to receiving a third message from a network exposure function (NEF), wherein the NEF transmits the third message in response to receiving a fourth message from a performance enhancement network node, and wherein the performance enhancement network node transmits the fourth message in response to receiving the quality-of-service request for the end user.

18. The network node of claim 17, wherein the instructions when executed by the processor, are capable of causing the processor to further perform:

sending a fifth message toward a base station from which the quality-of-service request for the end user was received, the fifth message to causes enablement of a second queue dedicated to the one or more data flows sourced from the end user in the base station.

19. The network node of claim 18, wherein the fifth message is transmitted to a session management function (SMF) of the network, wherein the SMF has transmitted a sixth message to an access and mobility management function (AMF) in response to receiving the fifth message, and wherein the AMF transmits a seventh message to the base station from which the quality-of-service request for the end user was received in response to receiving the sixth message.

20. A non-transitory machine-readable storage medium that provides instructions that, when executed by a processor, are capable of causing the processor to perform:

receiving a first message in a network to optimize one or more data flows based on a quality-of-service request for an end user;

enabling a first queue dedicated to the one or more data flows sourced for the end user in a network node of the network based on the first message; and upon a determination of congestion in the network, marking packets in the one or more data flows stored in the first queue as candidates to drop based on a queue size of the first queue, wherein the marking is to set explicit congestion notification bits of the packets.

* * * * *